United States Patent
Pruter

(10) Patent No.: US 12,481,314 B2
(45) Date of Patent: Nov. 25, 2025

(54) METHOD AND APPARATUS FOR PROTECTING ELECTRONIC EQUIPMENT FROM CONTAMINATION

(71) Applicant: Aspen Surgical Products, Inc., Caledonia, MI (US)

(72) Inventor: Rick L. Pruter, Coralville, IA (US)

(73) Assignee: Aspen Surgical Products, Inc., Caledonia, MI (US)

( * ) Notice: Subject to any disclaimer, the term of this patent is extended or adjusted under 35 U.S.C. 154(b) by 139 days.

(21) Appl. No.: 18/237,133

(22) Filed: Aug. 23, 2023

(65) Prior Publication Data

US 2023/0393611 A1     Dec. 7, 2023

Related U.S. Application Data

(62) Division of application No. 16/737,223, filed on Jan. 8, 2020, now Pat. No. 11,755,063.

(60) Provisional application No. 62/789,785, filed on Jan. 8, 2019.

(51) Int. Cl.

| | |
|---|---|
| G06F 1/16 | (2006.01) |
| B08B 17/04 | (2006.01) |
| B32B 37/12 | (2006.01) |
| B32B 38/10 | (2006.01) |
| B32B 38/18 | (2006.01) |
| B65D 65/00 | (2006.01) |

(52) U.S. Cl.
CPC ............ *G06F 1/1601* (2013.01); *B08B 17/04* (2013.01); *B32B 37/1292* (2013.01); *B32B 38/10* (2013.01); *B32B 38/1841* (2013.01); *B65D 65/00* (2013.01); *B32B 2309/08* (2013.01); *B32B 2309/65* (2013.01); *G06F 2200/1633* (2013.01); *G06F 2200/1634* (2013.01)

(58) Field of Classification Search
CPC .......... G06F 1/1601; G06F 2200/1633; G06F 2200/1634; B08B 17/04; B32B 37/1292; B32B 38/10; B32B 38/1841; B32B 2309/08; B32B 2309/65; B65D 65/00
See application file for complete search history.

(56) References Cited

U.S. PATENT DOCUMENTS

| | | | | |
|---|---|---|---|---|
| 3,430,543 | A * | 3/1969 | Cunningham | B31C 3/00 493/272 |
| 2003/0153810 | A1 | 8/2003 | Bertolero et al. | |
| 2007/0009698 | A1 | 1/2007 | Hoheisel | |
| 2008/0112842 | A1* | 5/2008 | Edwards | A61B 46/10 422/2 |
| 2011/0299168 | A1* | 12/2011 | Combs | G02B 1/11 359/601 |

FOREIGN PATENT DOCUMENTS

| | | |
|---|---|---|
| JP | 2004097533 A | 4/2004 |
| WO | WO-2016061241 A1 * | 4/2016 |

* cited by examiner

*Primary Examiner* — Christopher W Raimund
(74) *Attorney, Agent, or Firm* — Price Heneveld LLP

(57) ABSTRACT

A system and method for reducing the spread of contamination via tactile interaction with a touch screen display device for a medical imaging system in a clinical environment which includes a series of display device protection procedures each involving unfurling a rolled disposable cover which was stored adjacent to said display device and after removal of liner tape from two opposing ends of the unfurled disposable cover, attaching the same to the display device.

9 Claims, 7 Drawing Sheets

METHOD AND APPARATUS FOR PROTECTING ELECTRONIC EQUIPMENT FROM CONTAMINATION

CROSS-REFERENCE TO RELATED APPLICATIONS

This application is a division of U.S. application Ser. No. 16/737,223, filed on Jan. 8, 2020, now U.S. Pat. No. 11,755,063, entitled "METHOD AND APPARATUS FOR PROTECTING ELECTRONIC EQUIPMENT FROM CONTAMINATION," which claims priority to and the benefit under 35 U.S.C. § 119 (e) of U.S. Provisional Application No. 62/789,785, filed on Jan. 8, 2018, entitled, "METHOD AND APPARATUS FOR PROTECTING ELECTRONIC EQUIPMENT FROM CONTAMINATION," the disclosures of which are hereby incorporated herein by reference in their entirety.

FIELD OF THE INVENTION

The present invention generally relates to medical equipment and more particularly relates to equipment covers to protect medical equipment from contamination and, even more particularly, relates to disposable sterile monitor covers for medical equipment using displays screens.

BACKGROUND OF THE INVENTION

In the past, medical professionals have used drapes over imaging systems display screens to protect the screens from contamination.

While these types of protection may have many advantages in particular applications, they also have some drawbacks. For example, in many instances the drapes were too large and difficult to deploy. These systems are often too expensive for disposable applications.

Consequently, there exists a need for improved methods and apparatuses for efficiently and definitively covering the display screen of a medical imaging system in a quick and cost-effective manner.

SUMMARY OF THE INVENTION

According to one aspect of the present disclosure, a method of covering electronic display screens in a medical environment is provided. To create a disposable cover, a rectangular sheet of film with a top edge and a bottom edge, a front face and a back side, and a predetermined foldback location on the front face between the top edge and the bottom edge is provided. The bottom edge is folded over the front face of the rectangular sheet and back toward the top edge, without creasing, so that the bottom edge is aligned with the predetermined foldback location. A loop is created across the rectangular sheet by welding the film adjacent to the bottom edge to a first portion of the film adjacent to the predetermined foldback location. The rectangular sheet is flipped over so that the bottom edge is below the front face which is below the back side and a first strip of adhesive is adhered across a top portion of the back side of the rectangular sheet. A second strip of adhesive is adhered across the back side of the rectangular sheet at a point near the loop and between the loop and the first strip of adhesive. The rectangular sheet is then flipped over so that the bottom edge is above the front face of the sheet. A sheet of paper is rolled up to form a paper roll and inserted into the loop. To package the disposable cover, the loop with the paper roll therein is used to roll the rectangular sheet, up from the bottom, which thereby creates a rolled disposable cover, where the first strip is on the outside of the rolled disposable cover and is adjacent to the top edge. The rolled disposable cover is inserted into an elongated sleeve or tube and the sleeve or tube is closed. To use the rolled display cover to protect a display, the rolled disposable cover is removed from the sleeve or tube. The first liner is then removed from the first strip of adhesive and the first strip of adhesive is adhered to an upper portion of a bezel on a display. The rolled disposable cover is allowed to unfurl. A second liner is removed from the second strip of adhesive and the second strip of adhesive is adhered to a lower portion of a bezel on a display.

According to another aspect of the present disclosure, a method of creating a covering for electronic display screens in a medical environment includes creating a disposable cover by providing a rectangular sheet of film, which has a top edge and a bottom edge, a front face and a back side, and a predetermined foldback location on the front face between the top edge and the bottom edge. The bottom edge is folded over the front face of the rectangular sheet and back toward the top edge, without creasing, so that the bottom edge is aligned with the predetermined foldback location. A loop is created across the rectangular sheet by welding the film adjacent to the bottom edge to a first portion of the film adjacent to the predetermined foldback location. Then, the rectangular sheet is flipped over so that the bottom edge is below the front face which is below the back side and a first strip of adhesive is adhered across a top portion of the back side of the rectangular sheet. A second strip of adhesive is adhered across the back side of the rectangular sheet at a point near the loop and between the loop and the first strip of adhesive. The rectangular sheet is then flipped over so that the bottom edge is above the front face of the sheet. A sheet of paper is rolled up to form a paper roll and the paper roll is then inserted into the loop.

According to yet another aspect of the present disclosure, a method of packaging a covering for electronic display screens in a medical environment includes packaging a disposable cover by using a loop with a paper roll therein to roll a rectangular sheet, up from a bottom, which thereby creates a rolled disposable cover, where a first strip is on an outside of the rolled disposable cover and is adjacent to a top edge of the rectangular sheet. The rolled disposable cover is inserted into an elongated sleeve or tube and the sleeve or tube is closed.

These and other features, advantages, and objects of the present disclosure will be further understood and appreciated by those skilled in the art by reference to the following specification, claims, and appended drawings.

BRIEF DESCRIPTION OF THE DRAWINGS

The invention may be more fully understood by reading the foregoing description of the preferred embodiments of the invention, in conjunction with the appended drawings wherein.

DETAILED DESCRIPTION

Although described with particular reference to stand alone computer monitors such as flat panel LCD displays, the system and method for protecting from contamination display equipment in a medical environment can be implemented in many different types of image displaying systems for many different uses in many different environments.

In an embodiment, the system and method of the present invention described herein can be viewed as examples of many potential variations of the present invention which are protected hereunder.

Figure 1:
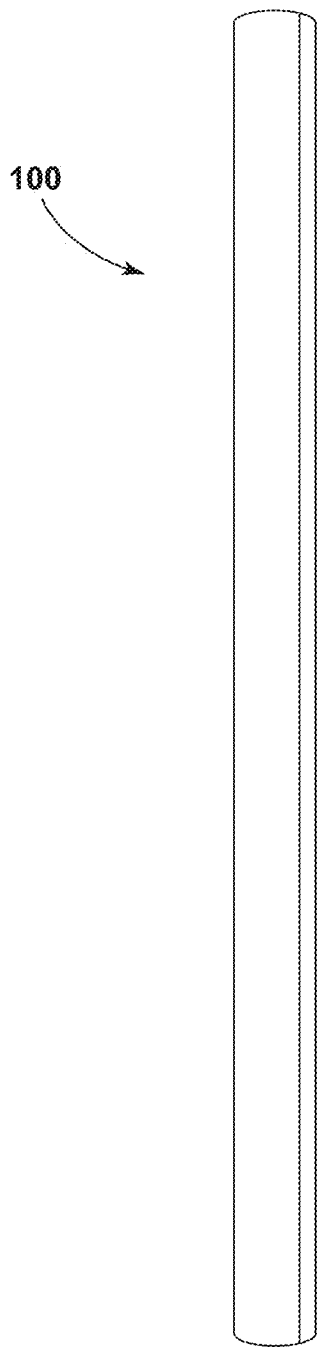
FIG. 1 is a perspective view of the system of the present invention in a rolled up state.

Now referring to the drawings wherein like numerals refer to like matter throughout and more particularly FIG. 1, there is shown a system 100 which can be a single sheet of 0.0045" nominal thickness, a blend of polyethylene/ethyl vinyl acetate (EVA) (or a suitable substitute) fully rolled up. The precise formula of this blend is unknown to the Applicant and Inventor but is commercially available from Film Tech LLC of Stanley, WI under the trade name of FT800011 EVA Film. The precise implementation of the present invention will vary depending upon the particular application.

Figure 2:
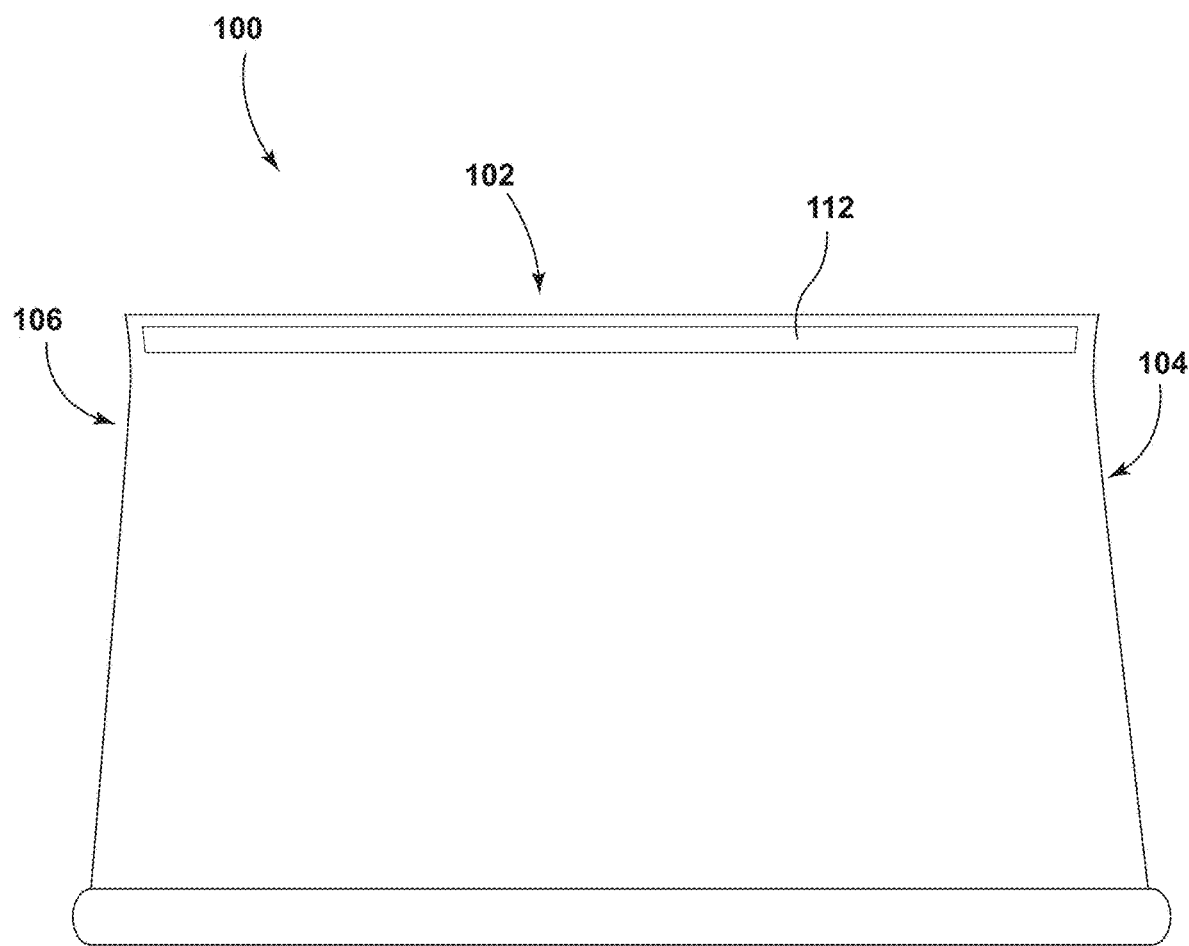
FIG. 2 is a perspective view of the system of FIG. 1 in a partially unrolled state.

Now referring to FIG. 2, there is shown a perspective view of the system 100 of FIG. 1 in a partially unrolled state with a top edge 102, right edge 104, left edge 106, open or non-screen side 110 and top adhesive cover 112.

Figure 3:
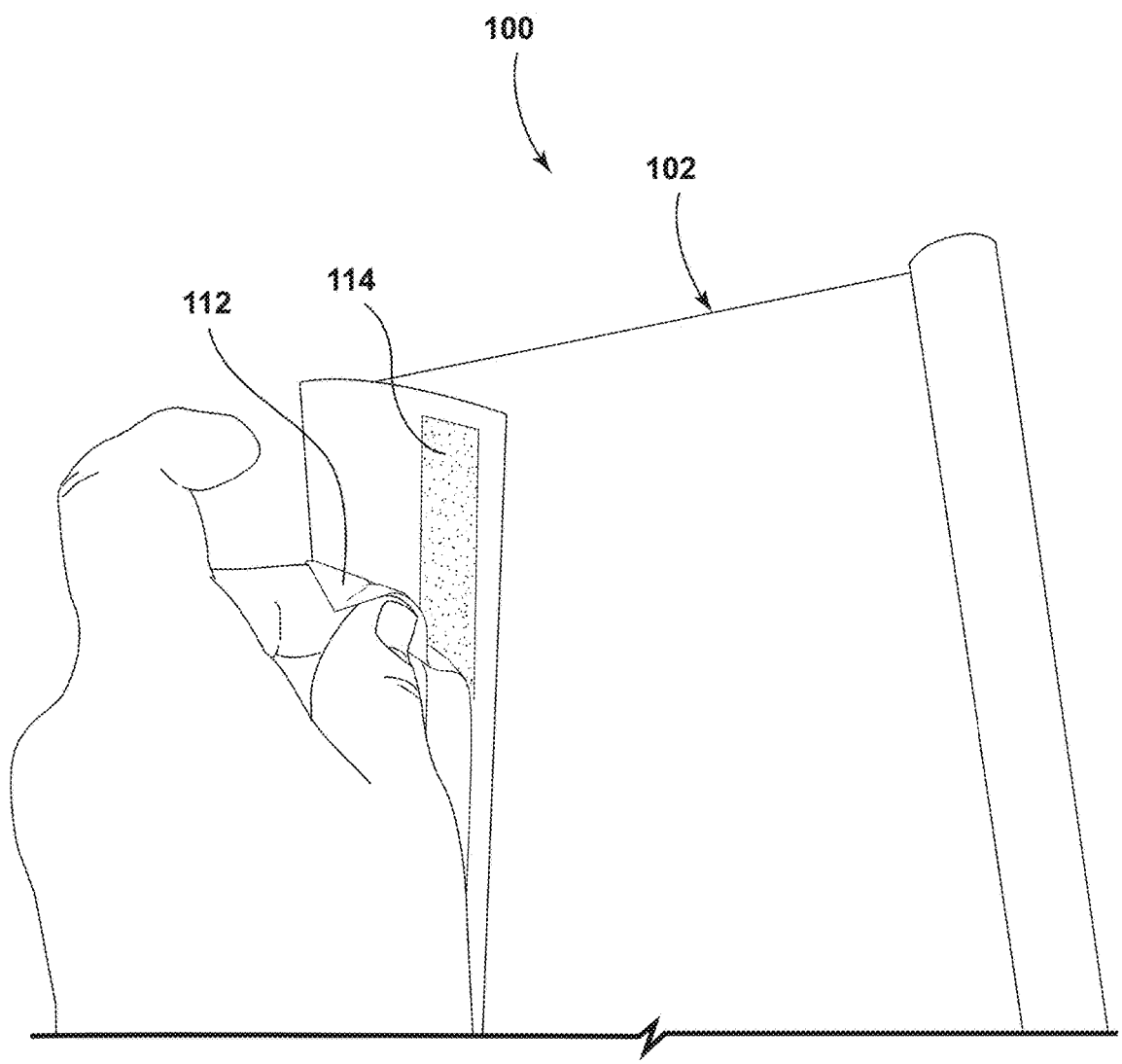
FIG. 3 is perspective view of the system of FIG. 2 in a partially dismantled state.
Figure 5:
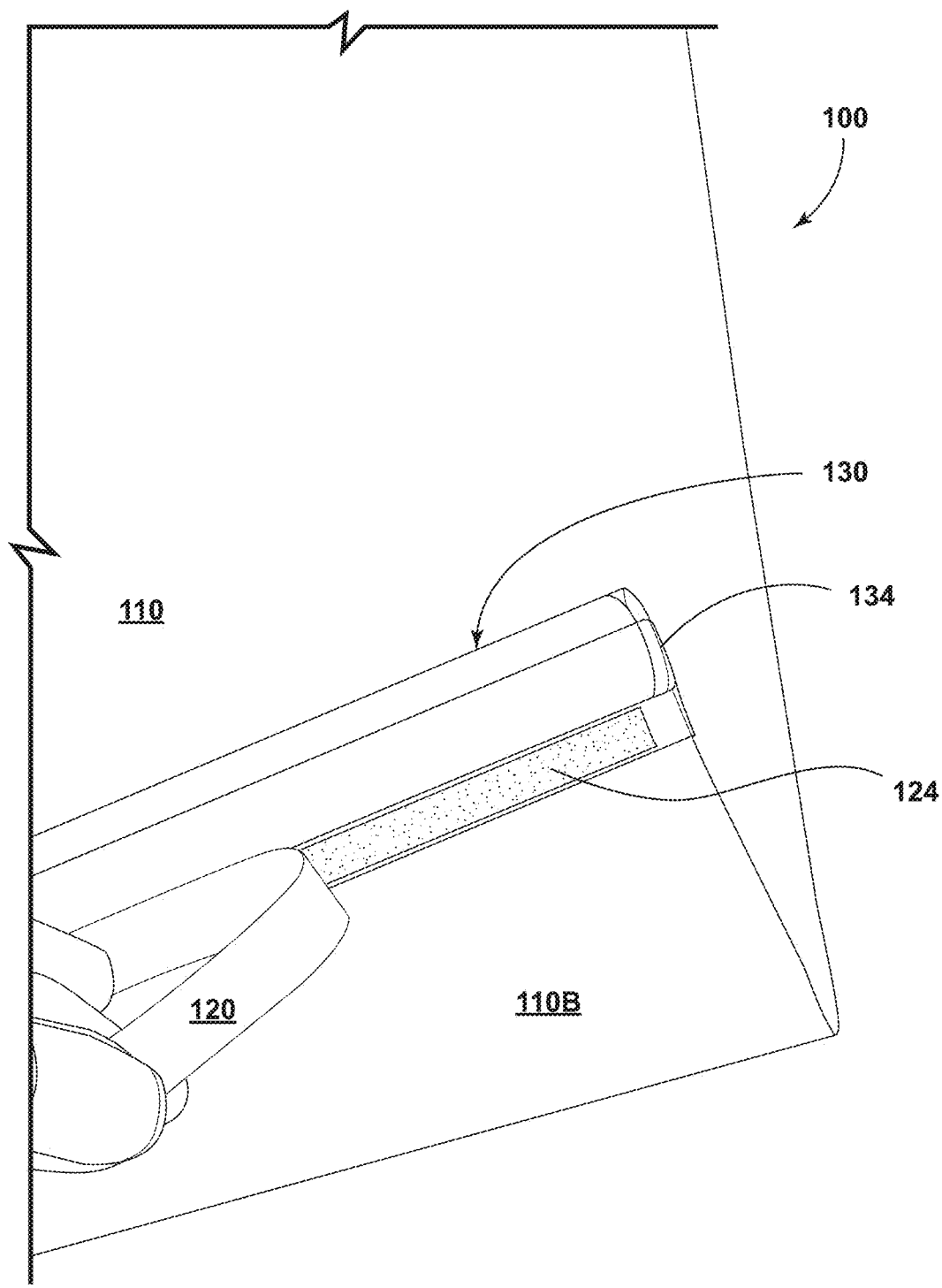
FIG. 5 is perspective view of the system of FIG. 4 after having a portion thereof folded back and with a portion of an adhesive cover partially detached.

Now referring to FIG. 3, there is shown the system 100 in a partially unrolled and partially dismantled state where the top has been folded back and the adhesive cover 112 is pulled away from the top adhesive 114 disposed on the back side 110B (see FIG. 5).

Figure 4:
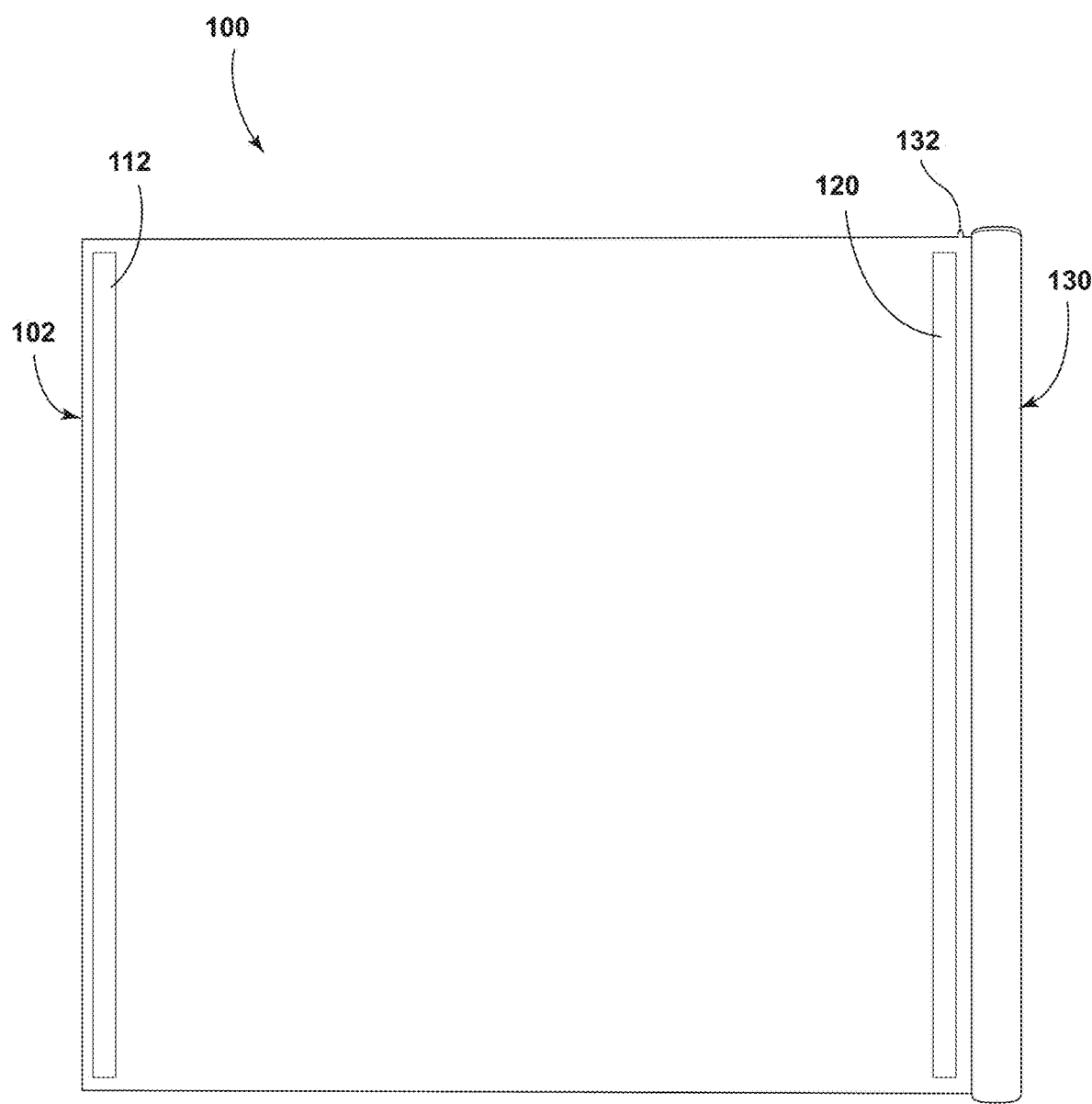
FIG. 4 is perspective view of the system of FIG. 1 in a fully unrolled state.

Now referring to FIG. 4, there is shown a system in a fully unrolled state with a bottom adhesive cover 120, a rolling system 130 for helping the system 100 to unroll during the process of installation on a screen to be protected. A small portion 132 of the sheet can be seen extending beyond the main portion of the rolling system 130.

Now referring to FIG. 5, there is shown a system of the present invention in a completely unrolled state with a portion thereof folded so that side 110 is folded back on itself and backside 110B is exposed so that the bottom adhesive cover 120 can be seen to be peeled away from the back side 110B, exposing a bottom adhesive 124.

Figure 6:
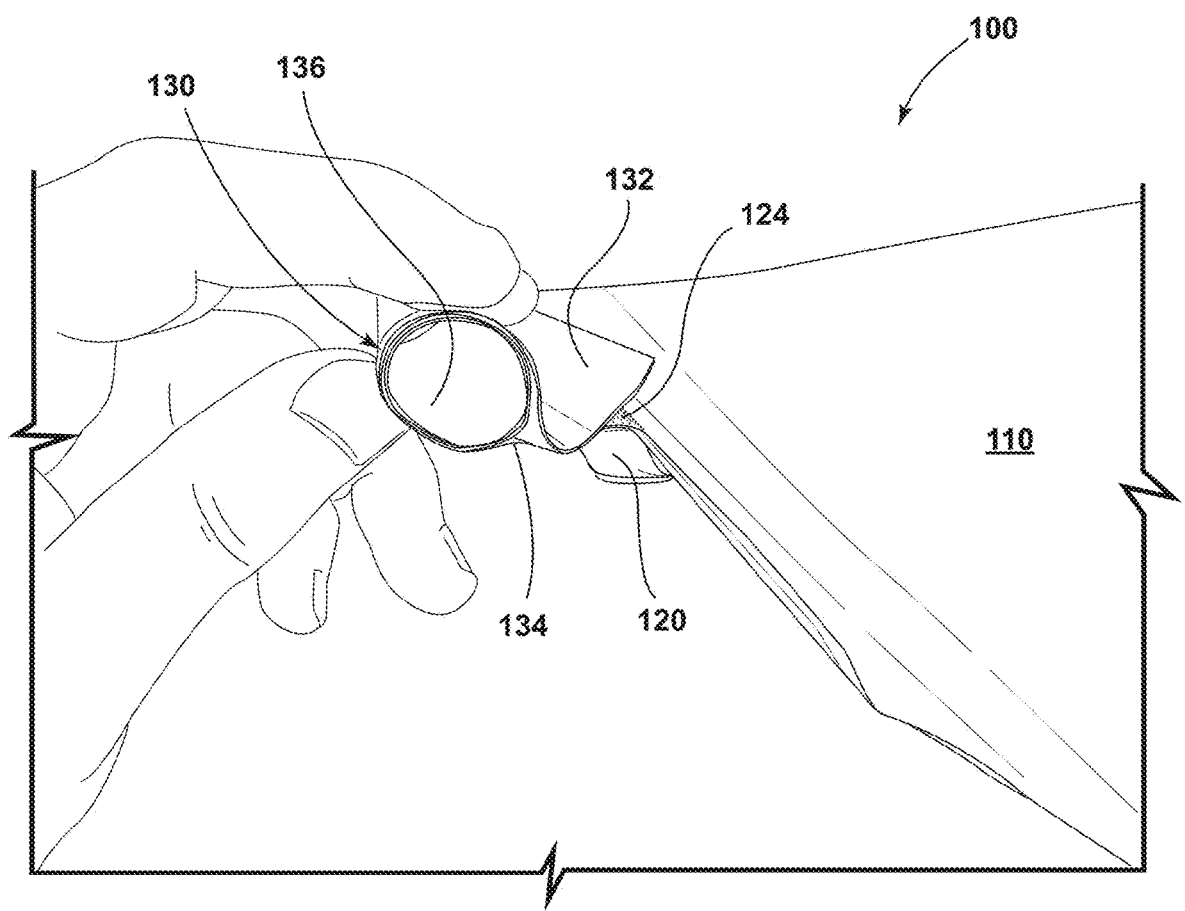
FIG. 6 is an end view of the system of the FIG. 4.

Now referring to FIG. 6, there is shown an end view of a portion of the system 100, which shows the bottom adhesive cover 120 partially hanging free from the back side 110B. The small portion 132 can be seen, as well as a loop portion 134, which are both formed by creating a heat weld (such as made with an impulse heat sealer) in the polyethylene sheet. The adhesive 124 can be seen through the open side 110 of the sheet. Also shown disposed inside the loop portion 134, and which tends to expand and fill the loop portion 134, is a rolled up printed sheet of paper 136, which creates a spindle for assisting in rolling up the sheet (without creases or folds) and creates a weight which helps in unrolling the sheet after the system 100 is attached to a screen to be protected. The roll of paper 136 could be substituted with a more rigid tube or rod in some applications.

Figure 7:
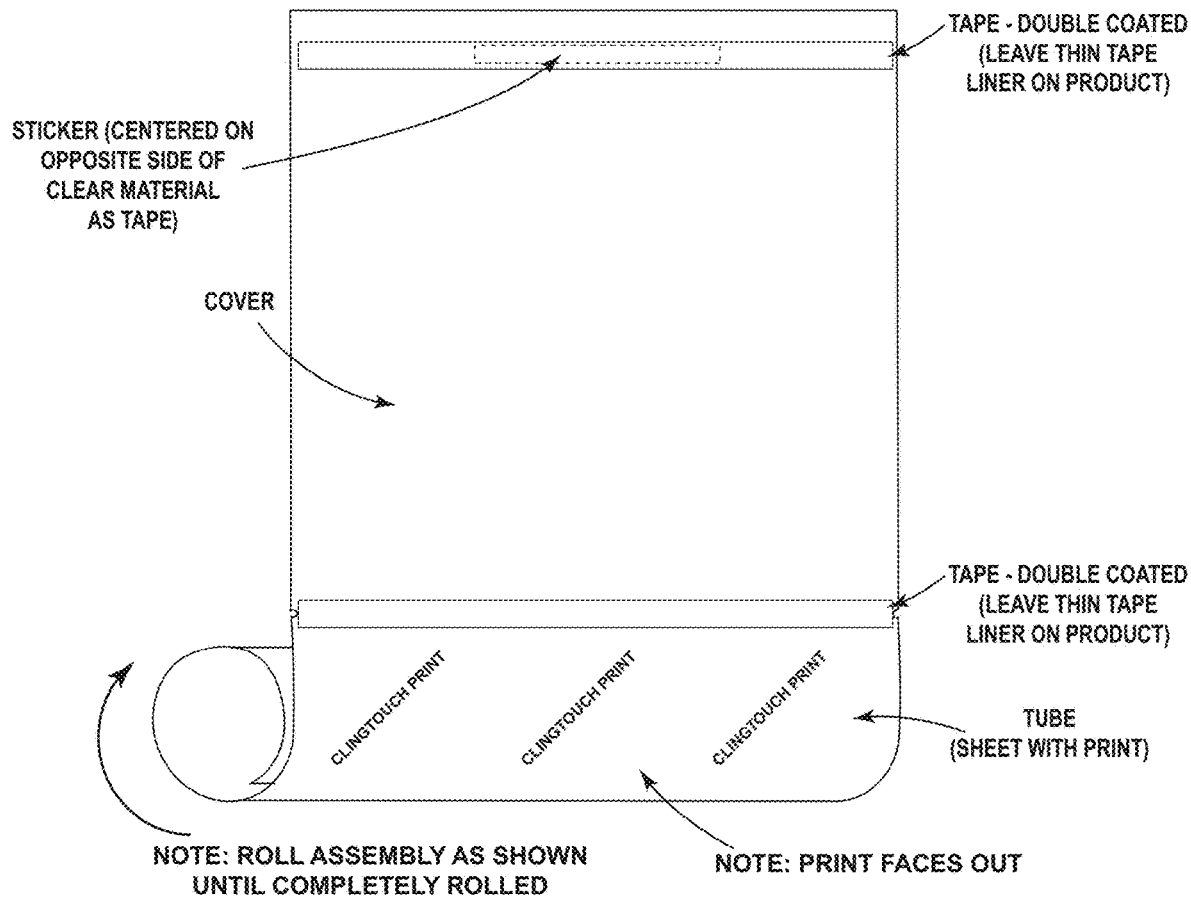
FIG. 7 is a cartoon drawing of the system of the present invention showing a front view of the system, with a non-realistic end view of a rolled portion at the bottom.
Figure 8:
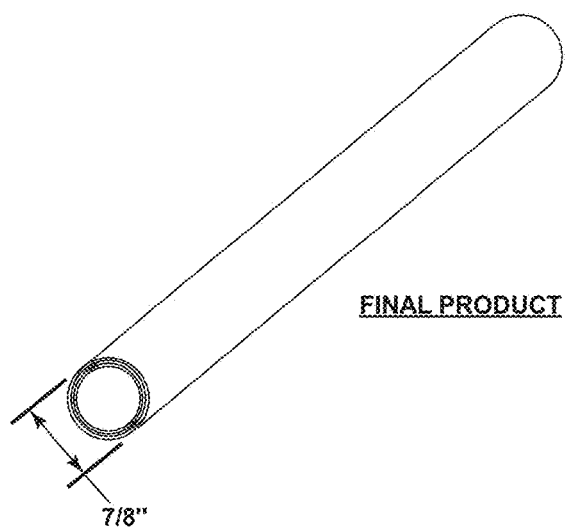
FIG. 8 is a view of the final product of the system and method of the present invention.

FIGS. 7 and 8 show representations of the final product in differing states of openness and with annotations thereon.

In operation, the system 100 can be used as follows: the system 100 is removed from any packaging. The top adhesive cover 112 is removed, thereby exposing top adhesive 114, which is then applied to a top portion of a bezel around a computer screen or monitor or the like. The system 100 is then unfurled as the rolling system 130 drops toward the bottom of the screen to be protected, see FIG. 4. Then the bottom of the sheet is folded over, exposing the bottom adhesive cover 120, which is peeled back to expose the bottom adhesive 124, which is then pressed against a bottom portion of a bezel of the screen to be protected. The backside 110B of the sheet may cling to the viewing portion of the screen, which may be smoothed out, if necessary, by peeling the sheet off the screen and then pressing the sheet against the screen starting at the top working downward, i.e. before the bottom adhesive is again pressed to the bottom portion of the bezel.

While this invention is well suited for protecting stand alone computer monitors, it can equally be applied to laptop computers, where the sheet would protect the screen and the keyboard as well. In such applications, it may be desirable, but not necessarily required, to include additional strips of adhesive across the sheet so that an adhesive is at the top and bottom of both the screen and the keyboard section. In some laptop applications with cameras in the top bezel of the screen, portions of the sheet extending above the top adhesive may be removed or trimmed so as not cover any such cameras.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

What is claimed is:

1. A method of covering electronic display screens in a medical environment comprising the steps of:
    creating a disposable cover including the steps of:
        providing a rectangular sheet of film, which has a top edge and a bottom edge, a front face and a back side, and a predetermined foldback location on the front face between the top edge and the bottom edge;
        folding the bottom edge over the front face of the rectangular sheet and back toward the top edge, without creasing, so that the bottom edge is aligned with the predetermined foldback location;
        creating a loop across the rectangular sheet by welding the film adjacent to the bottom edge to a first portion of the film adjacent to the predetermined foldback location;
        flipping over the rectangular sheet so that the bottom edge is below the front face which is below the back side;
        adhering a first strip of adhesive across a top portion of the back side of the rectangular sheet;
        adhering a second strip of adhesive across the back side of the rectangular sheet at a point near the loop and between the loop and the first strip of adhesive;
        flipping over the rectangular sheet so that the bottom edge is above the front face of the sheet; and rolling up a sheet of paper to form a paper roll and inserting the paper roll into the loop;

packaging the disposable cover including the following steps:

using the loop with the paper roll therein to roll, up from the bottom, the rectangular sheet, and thereby creating a rolled disposable cover, where the first strip is on the outside of the rolled disposable cover and is adjacent to the top edge;

inserting the rolled disposable cover into an elongated sleeve or tube; and closing the sleeve or tube;

using said rolled display cover for protecting a display including the following steps:

removing the rolled disposable cover from the sleeve or tube;

removing a first liner from said first strip of adhesive;

adhering said first strip of adhesive to an upper portion of a bezel on a display;

allowing said rolled disposable cover to unfurl;

removing a second liner from said second strip of adhesive; and adhering said second strip of adhesive to a lower portion of the bezel on the display.

2. The method of claim 1, wherein said rectangular sheet has dimensions of 43 cm by 43 cm.

3. The method of claim 1, wherein steps to create the disposable cover are all performed in an ISO class 8, or better, clean room.

4. The method of claim 1, wherein the film is a clear film of polyethylene or EVA film.

5. The method of claim 1, wherein said film is single ply.

6. The method of claim 5, wherein said film is 0.1143 mm (0.0045 inches) thick plus or minus 0.00762 mm (0.0003 inches).

7. The method of claim 1, further comprising the steps of:

removing said rolled disposable cover from said display and disposing of said rolled disposable cover; and removing from a container coupled to said display, a replacement disposable cover, previously containing said rolled disposable cover, wherein said replacement disposable cover is substantially identical with said rolled disposable cover.

8. A method of creating a covering for electronic display screens in a medical environment comprising the steps of:

creating a disposable cover including the steps of:

providing a rectangular sheet of film, which has a top edge and a bottom edge, a front face and a back side and a predetermined foldback location on the front face between the top edge and the bottom edge;

folding the bottom edge over the front face of the rectangular sheet and back toward the top edge, without creasing, so that the bottom edge is aligned with the predetermined foldback location;

creating a loop across the rectangular sheet by welding the film adjacent to the bottom edge to a first portion of the film adjacent to the predetermined foldback location;

flipping over the rectangular sheet so that the bottom edge is below the front face which is below the back side;

adhering a first strip of adhesive across a top portion of the back side of the rectangular sheet;

adhering a second strip of adhesive across the back side of the rectangular sheet at a point near the loop and between the loop and the first strip of adhesive;

flipping over the rectangular sheet so that the bottom edge is above the front face of the sheet; and rolling up a sheet of paper to form a paper roll and inserting the paper roll into the loop.

9. A method of packaging a covering for electronic display screens in a medical environment comprising the steps of:

packaging a disposable cover including the following steps:

using a loop with a paper roll therein to roll, up from a bottom, a rectangular sheet, and thereby creating a rolled disposable cover, where a first strip of adhesive is on an outside of the rolled disposable cover and is adjacent to a top edge of the rectangular sheet, and wherein a second strip of adhesive is disposed;

adhering the second strip of adhesive across a back side of the rectangular sheet at a point near the loop and between the loop and the first strip of adhesive;

inserting the rolled disposable cover into an elongated sleeve or tube; and closing the sleeve or tube.

* * * * *